(12) United States Patent
Gao et al.

(10) Patent No.: US 6,623,356 B2
(45) Date of Patent: Sep. 23, 2003

(54) METHOD FOR ORGANIZING EVENTS IN A SIMULATION GAME

(75) Inventors: Hai-Xin Gao, Shanghai (CN); Say-Yee Wen, Taipei (TW)

(73) Assignee: Inventec Tomorrow Studio Co., Ltd. (TW)

( * ) Notice: Subject to any disclaimer, the term of this patent is extended or adjusted under 35 U.S.C. 154(b) by 103 days.

(21) Appl. No.: 09/986,402

(22) Filed: Nov. 8, 2001

(65) Prior Publication Data

US 2002/0058540 A1 May 16, 2002

(30) Foreign Application Priority Data

Nov. 16, 2000 (TW) ......................... 89124302 A

(51) Int. Cl.$^7$ ................................. A63F 9/24
(52) U.S. Cl. .......................... 463/1; 273/461
(58) Field of Search ................. 463/1, 30–34, 463/37, 43; 273/461; 707/2, 102, 104.1; 709/100, 102, 106, 201, 318; 712/1, 28–30

(56) References Cited

U.S. PATENT DOCUMENTS

| | | | | |
|---|---|---|---|---|
| 6,123,619 A | * | 9/2000 | Tokita et al. | 463/43 |
| 6,341,279 B1 | * | 1/2002 | Nye | 707/3 |
| 6,363,435 B1 | * | 3/2002 | Fernando et al. | 709/318 |
| 2002/0137557 A1 | * | 9/2002 | Ishii et al. | 463/8 |

\* cited by examiner

*Primary Examiner*—Kim Nguyen
(74) *Attorney, Agent, or Firm*—Birch, Stewart, Kolasch & Birch, LLP

(57) ABSTRACT

The invention provides a method for organizing events in a simulation game. The method includes at least the steps of: sequentially reading each event to create an event loop mechanism; deciding a place where the event happens according to a place number set for the place; deciding an event status according to event results set for passing X number of days; deciding an event process according to job conditions set for the event; processing an event according to an event number set for the event; processing an event according to point number allocated for a point on a map; and selectively completing an event result according to selections set for a selective event.

6 Claims, 8 Drawing Sheets

METHOD FOR ORGANIZING EVENTS IN A SIMULATION GAME

BACKGROUND OF THE INVENTION

1. Field of the Invention

The invention generally relates to a method for organizing events in a computer game, and more particularly relates to a method for organizing events in a simulation game.

2. Related Art

"Game theory" is an important element for a good software game. A software game cannot be a good product without the support of game theory. Especially for a live event game, game theory is absolutely necessary. To increase the attraction of a game, the designer has to work hard on processing events, allocating jobs and expressing emotions. If the events are simplified, such as fighting or shooting games, then dedicated graphics or some excellent and innovative creative thinking should be used. For simulation games such as roll-playing games (RPG), simulation games (SLG), or the currently popular multi-user domain games (MUD), the event processing, job allocation and emotional expression should be delicately arranged in order to achieve a good product.

For current software games on the market, some event organization tools are usually applied. However, due to the differences between games, there is no event organizer that can be used for every game.

In a simulation game, events are essential elements of the virtual world in which they are transduced into jobs or tasks for processing the game. In a simpler game, events are in a tree structure such that only those events in a particular stream are related. In a more complicated game, events are correlated in a web. They are incorporated with time, place and people elements. Therefore, developing an event organizer for handling these elements would be very helpful.

SUMMARY OF THE INVENTION

The object of the invention is therefore to provide an event organizer for organizing events in a simulation game. The event organizer is characterized by the following:

1. Waiting mechanism. Conditions can be created in the simulation game for which the results will not be completed for several days. This will simulate delayed events as in real life.
2. Setting for event location. In the simulation game, a place on a map or a building at a selected location can be designated for the occurrence of particular events so as to simulate different events happening in different places, as in real life.
3. Job mechanism. Players in the simulation game can accept a job, finish the job and be evaluated on their performance. This will simulate job assignments and evaluations as in real life.
4. Event-in-event mechanism. In the simulation game, an accident event may occur within a regular event so as to simulate unexpected things happening in real life, such as biting down on a rock in your food when eating.
5. Treasure-hunting mechanism. Treasure can be embedded in designated places for hunting. This is to simulate conditions in real life like digging with a hoe to get to a stone in the ground.
6. Event branch mechanism. In the simulation game, a player making different decisions will get different results. This simulates reason and result situations in real life.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

To create a simulation game, we have to start with event theories. By analyzing, comparing and inferring the events in the virtual world, a bank of original event models can be created. The original models can later be modified and varied to generate different kinds of events. Meanwhile, the conditions of events, such as weather, geographic environment and social environment, have to be considered. Though a theoretical study of the philosophy of the event conditions, a practical mathematical model can be summarized and applied to the event model. The composition of an event, the conditions of the event, the parameters for triggering the event, and the relationships between the event and the economic, organizational, geographical and randomized factors should all be carefully analyzed. Based on these factors, the events are organized to form an interconnected structure. Through this process, a simulation game with full vitality and a wonderful story can be designed and produced.

Generally, a simple event model bank can do the job. The invention provides an event process accompanied with a set of game theories for obtaining better results.

Figure 1:
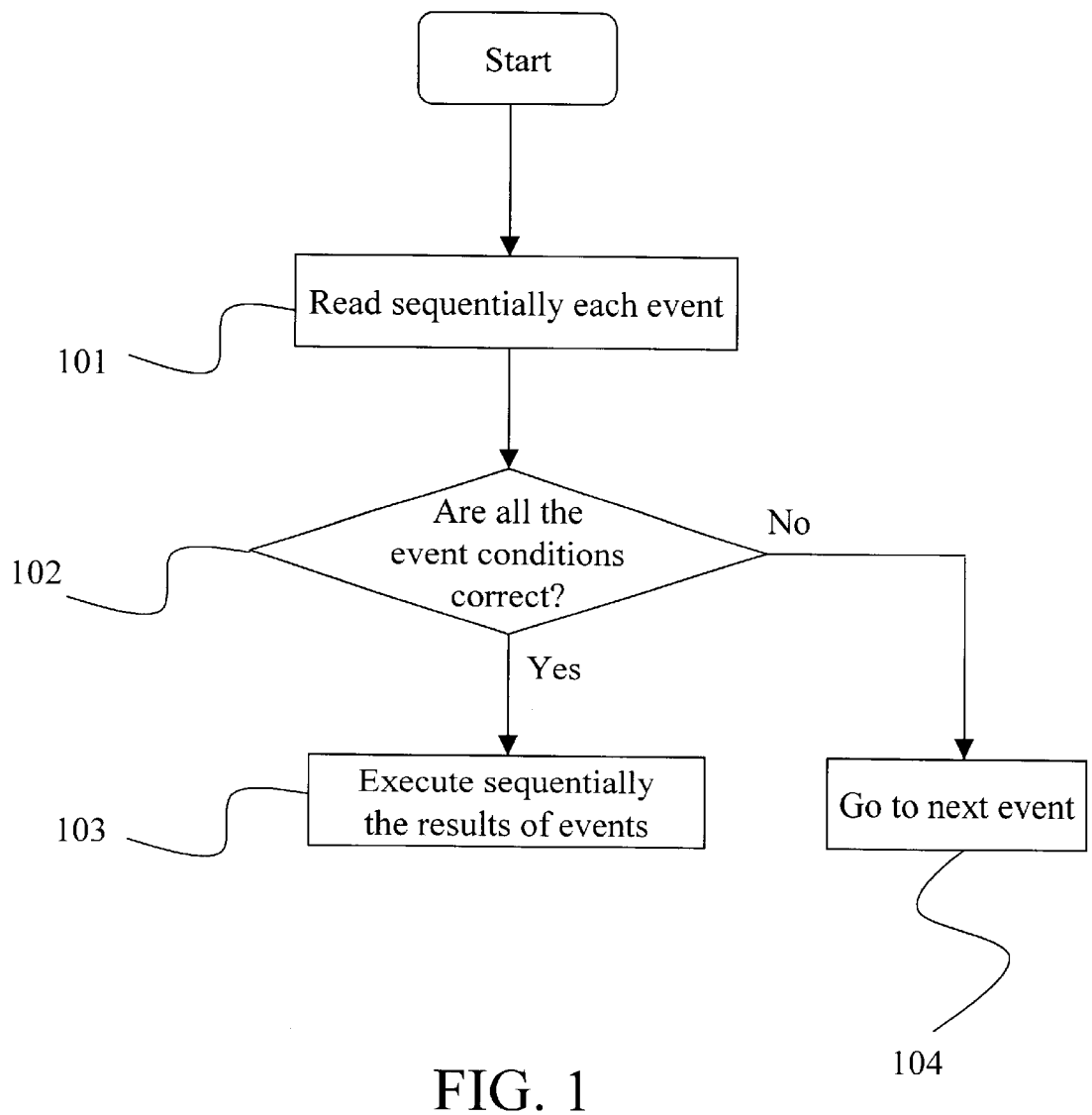
FIG. 1 is a flowchart showing the loop of event processes for a simulation game according to the invention.

FIG. 1 is a flowchart showing the loop of event processes for a simulation game according to the invention. Each event includes the three factors of conditions, executors and results. There are many conditions. The executors can be novice players or proficient players. There are also many possible results. In step 101 of the process, each event is sequentially read. Conditions of the event are then checked (step 102). If the conditions are not all correct, the results will be executed sequentially (step 103). If they are all correct, then it goes to the next event (step 104) so as to finish the event loop.

Figure 2:
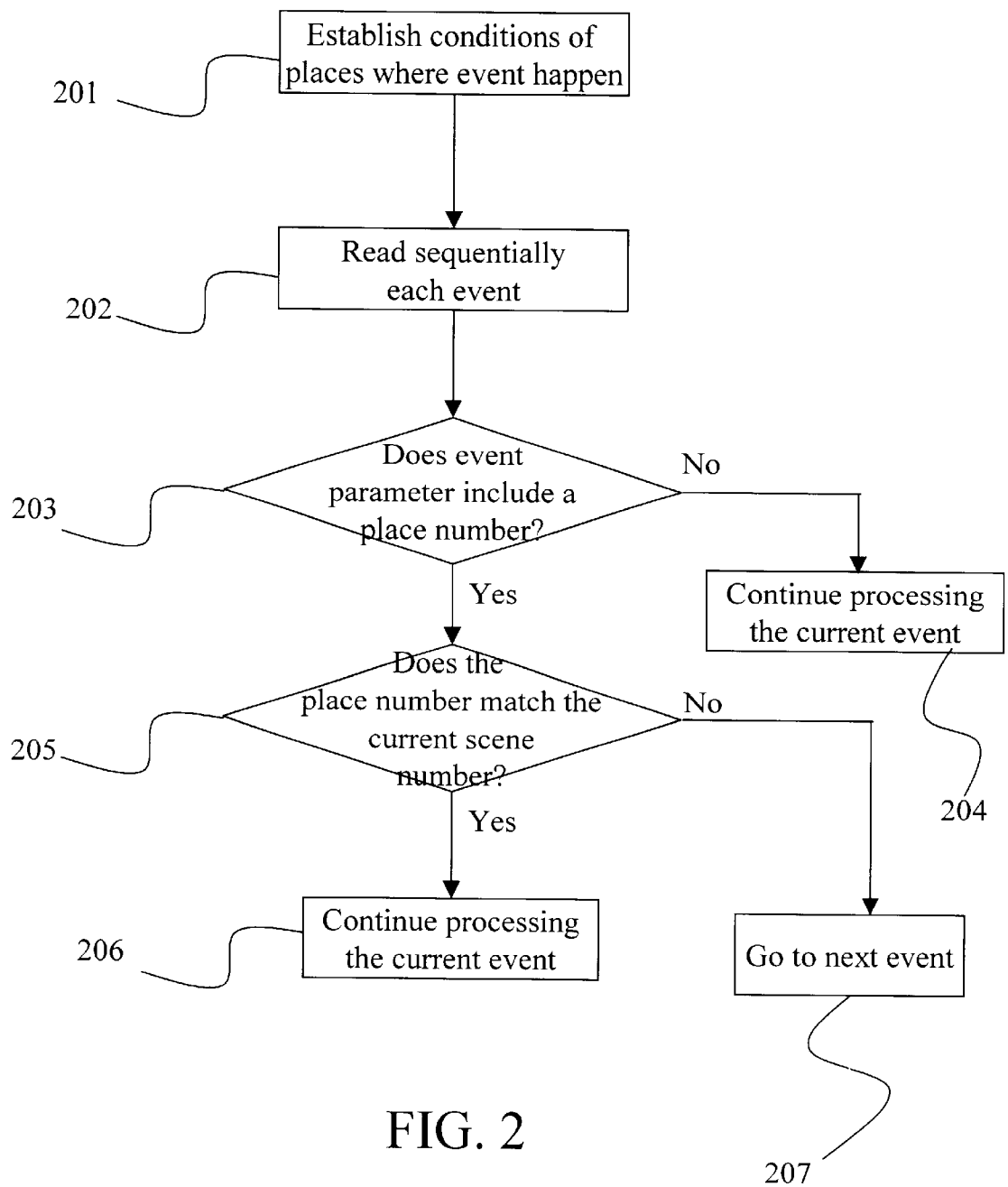
FIG. 2 is a flowchart showing the process of setting event locations for a simulation game according to the invention.

FIG. 2 is a flowchart showing the process of setting an event location for a simulation game according to the invention. First, conditions are established for places where the event will happen (step 201). For example, conditions are established for "happen in place (x)", in which x is a number (such as 1001 for a first place, and 1002 for a second place). Each event is then sequentially read (step 202). In the simulation game, the daily event loop doesn't process the location information. However, when the game location moves from a main map to a certain place, a game event loop is executed in which the event condition includes a place parameter, and the "happen in place (x)" is processed. Then, whether or not the event parameter includes a place number is checked (step 203). If there is no place number the current event continues to be processed (step 204). Otherwise, it further checks whether the place number matches the current scene number (step 205). If it does, it continues processing the current event (step 206). If not, it goes on to the next event (step 207).

Figure 3:
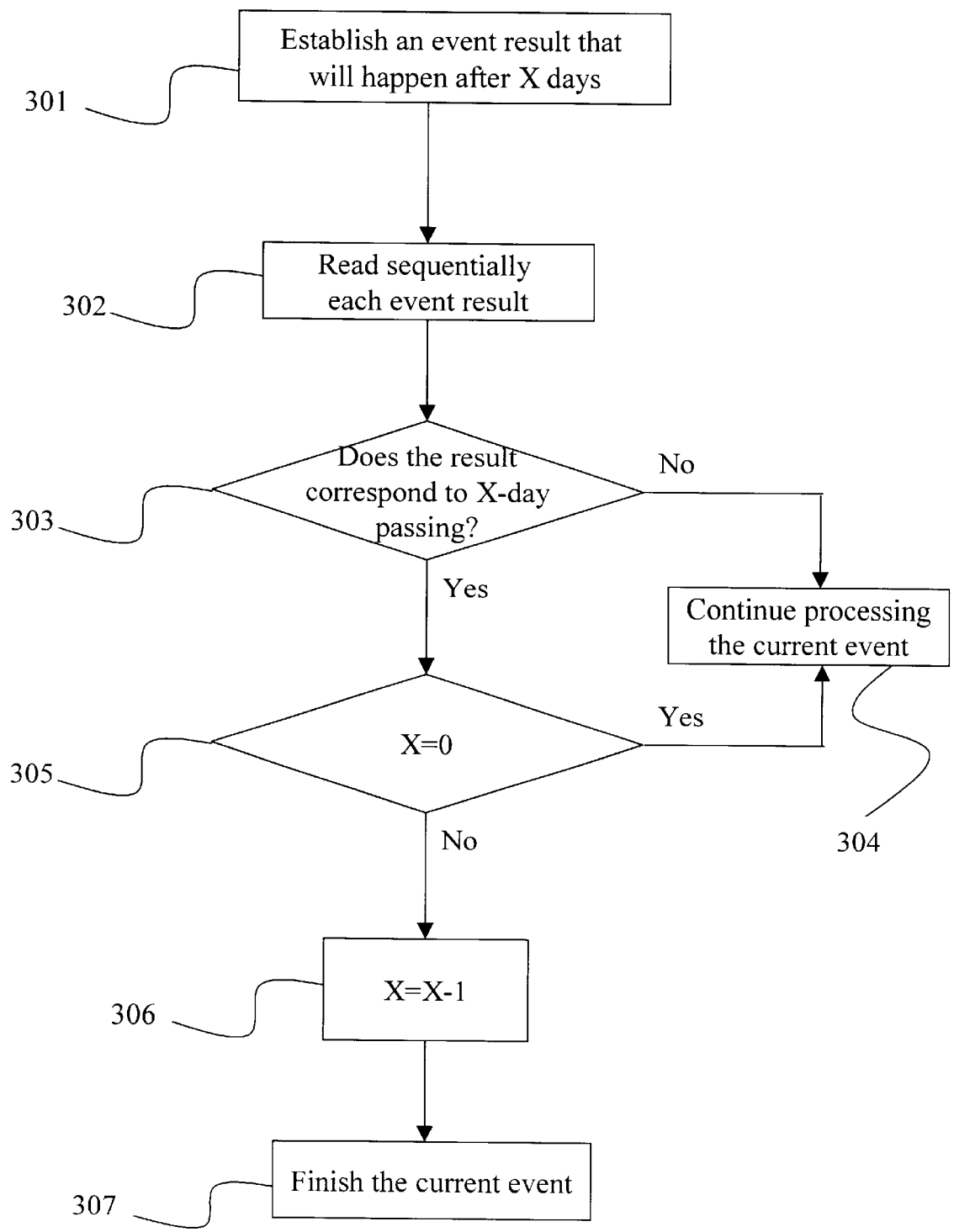
FIG. 3 is a flowchart showing the process of waiting for event results for a simulation game according to the invention.

FIG. 3 is a flowchart showing the process of waiting for event results for a simulation game according to the invention. First, event results that will happen after "X" number of days are established (step 301). Each event result is then sequentially read (step 302). Whether or not the result corresponds to X-day(s) passing is checked (step 303). It continues processing the current event if "X" number of day(s) has not yet passed (step 304). Otherwise, it further checks whether X=0 (step 305). It continues processing the current event if the answer is yes (step 304). Otherwise, it reduces a day by setting X=X−1 (step 306), then completes the current event (step 307) and goes to the next event.

Figure 4:
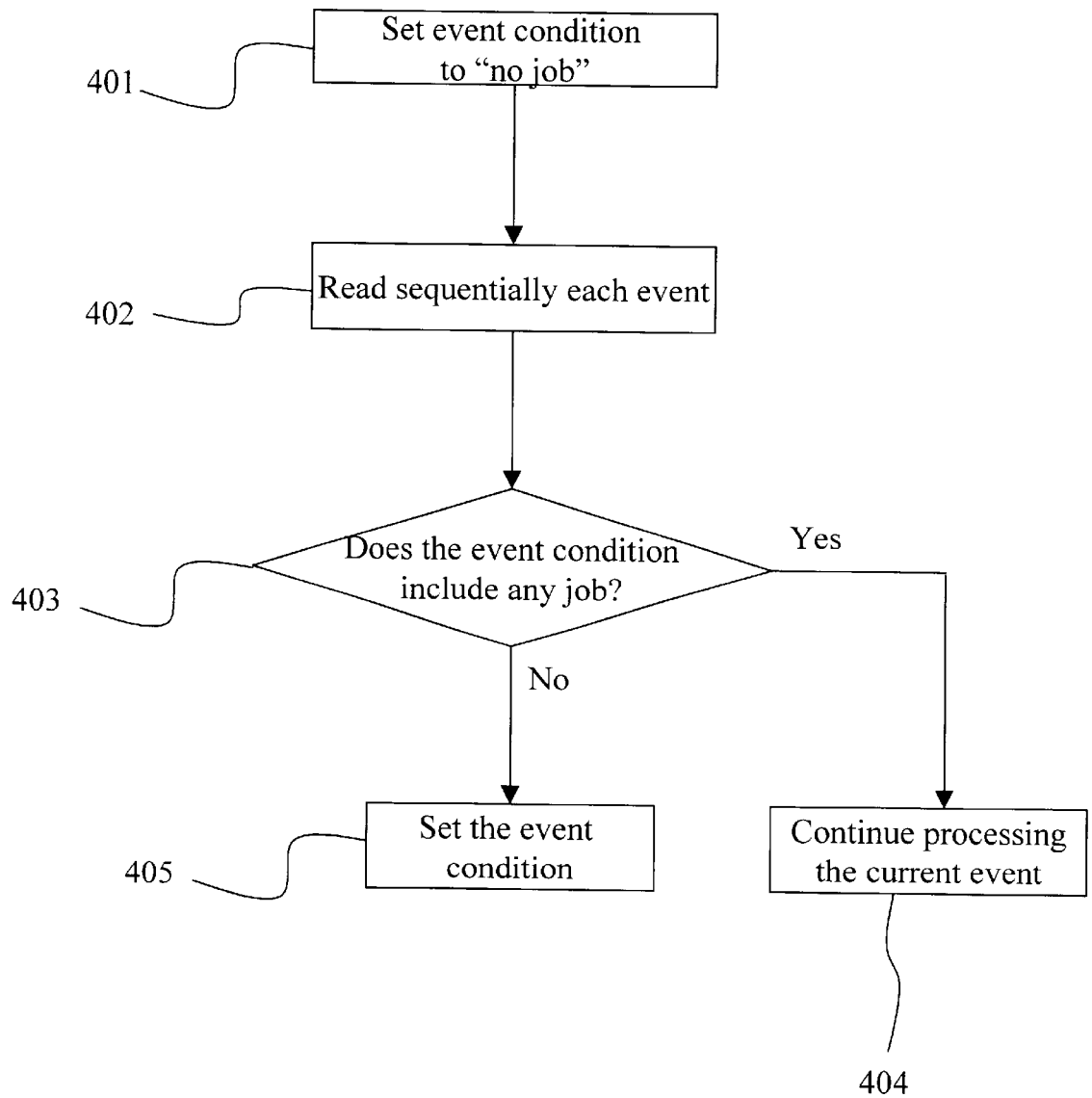
FIG. 4 is a flowchart showing the process of setting a job for a simulation game according to the invention.

FIG. 4 is a flowchart showing the process of setting a job for a simulation game according to the invention. First, the event condition is set to "no job" (step 401). Each event result is then sequentially read (step 402). Whether or not the event condition includes a job is checked (step 403). It continues processing the current event if there is a job (step 404). Otherwise, it sets the event condition to "job" (step 405). In the event loop, the event organizer supports only one job at a time. Therefore, by checking whether there is a job it can monitor the job condition and set a job when there is none.

Figure 5:
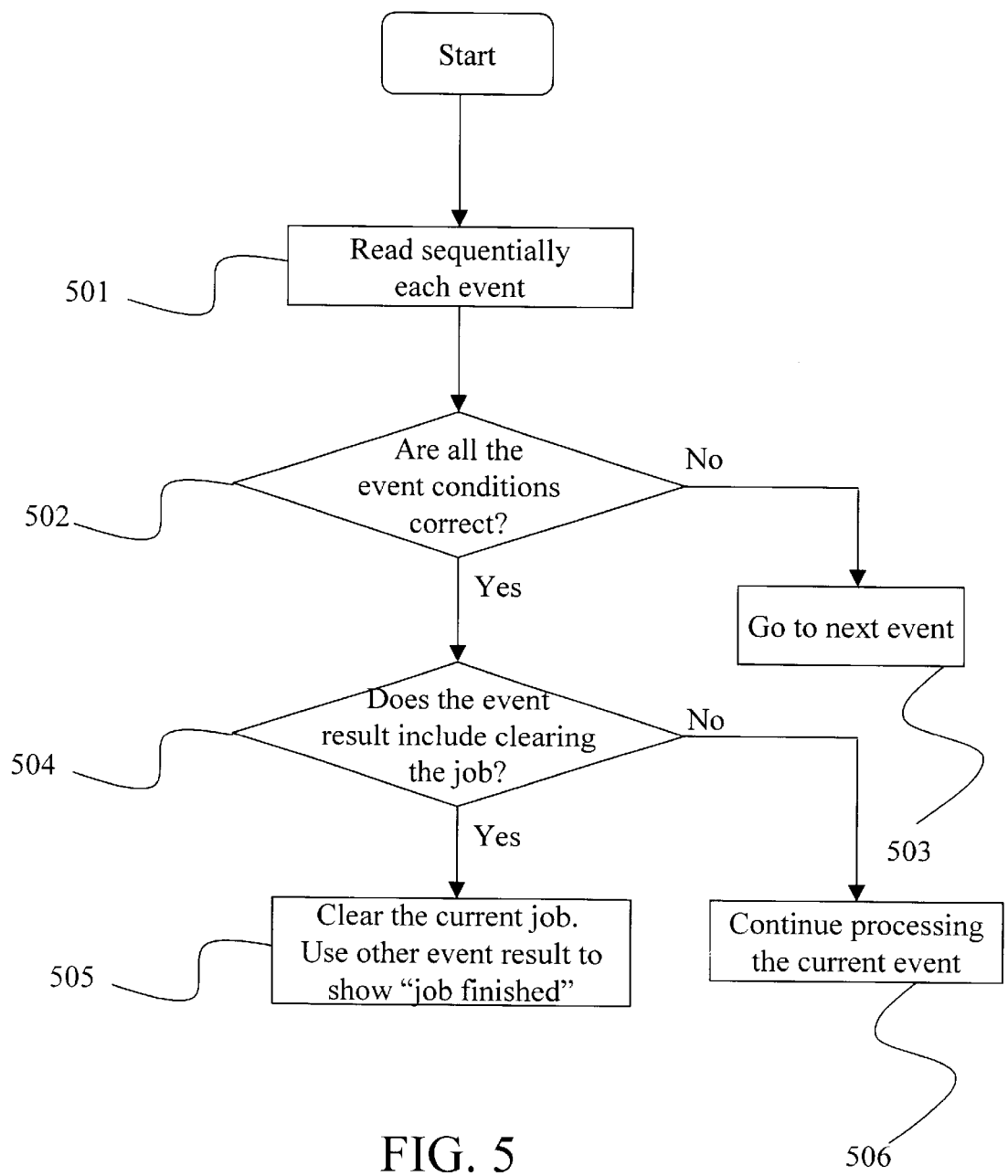
FIG. 5 is a flowchart showing the process of clearing a job for a simulation game according to the invention.

FIG. 5 is a flowchart showing the process of clearing a job for a simulation game according to the invention. Since a job has a time limitation, after a waiting process (as described above in FIG. 3), a job event result is checked, and the job can be cleared. First, each event is read sequentially (step 501). Then, whether or not all the event conditions are correct is checked (step 502). It goes to the next event if they are not all correct (step 503). Otherwise, it further checks whether the event result includes "clear the job" (step 504). If it does, it clears the current job, and uses another event result to show "job finished" (step 505). Otherwise, it continues processing the current event (step 506).

Figure 6:
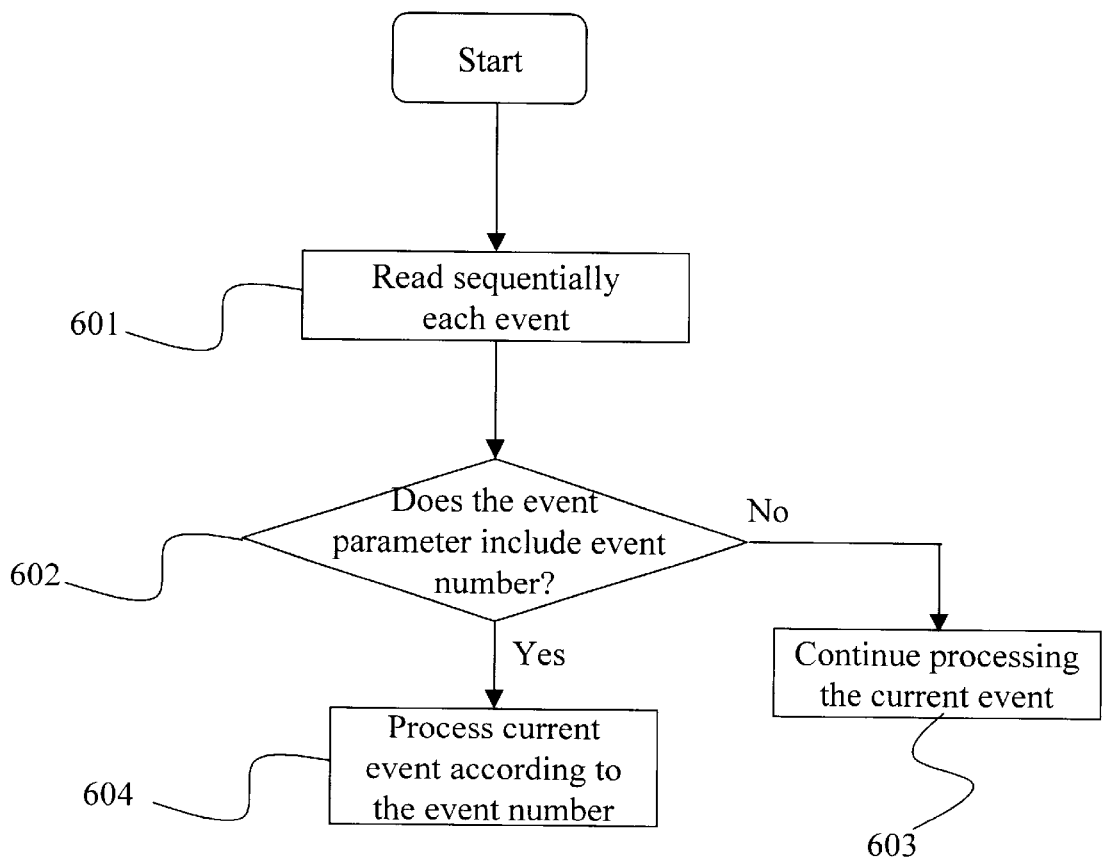
FIG. 6 is a flowchart showing the process of extending an event setting for a simulation game according to the invention.

FIG. 6 is a flowchart showing the process of extending an event setting for a simulation game according to the invention. In the simulation game, "unexpected" things may happen within a regular event. Conditions of "happen in event (x)" are set for different x events. In the event loop, an even number of a regular event is a parameter for checking if the conditions match, and an "unexpected" event can be executed. First, event parameters are set, and each event is read sequentially (step 601). Then whether or not the event parameter includes an event number is checked (step 602). It continues processing the current event if there is no event number (step 603). Otherwise, it processes the current even according to the event number (step 604).

Figure 7:
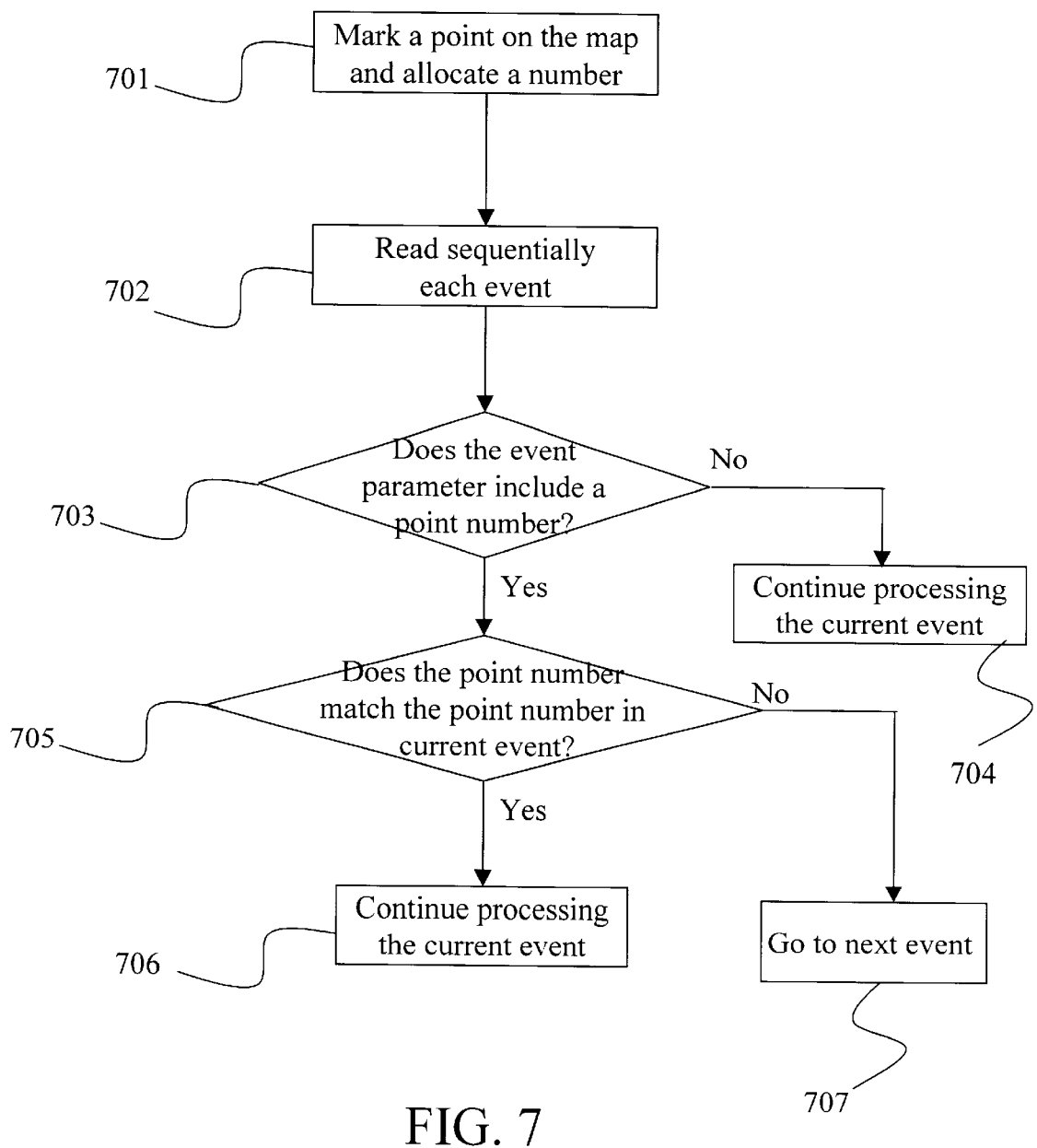
FIG. 7 is a flowchart showing the process of treasure hunting for a simulation game according to the invention.

FIG. 7 is a flowchart showing the process of treasure hunting for a simulation game according to the invention. First, we mark a point on a map and allocate a number for it (step 701). Then, each event is read sequentially (step 702), and whether or not the event parameter includes a point number is checked (step 703). It continues processing the current event if there is no point number (step 704). Otherwise, it further checks whether the point number matches the point number in the current event (step 705). It continues processing the current event if they do match (step 706). Otherwise, it goes to the next event (step 707).

Figure 8:
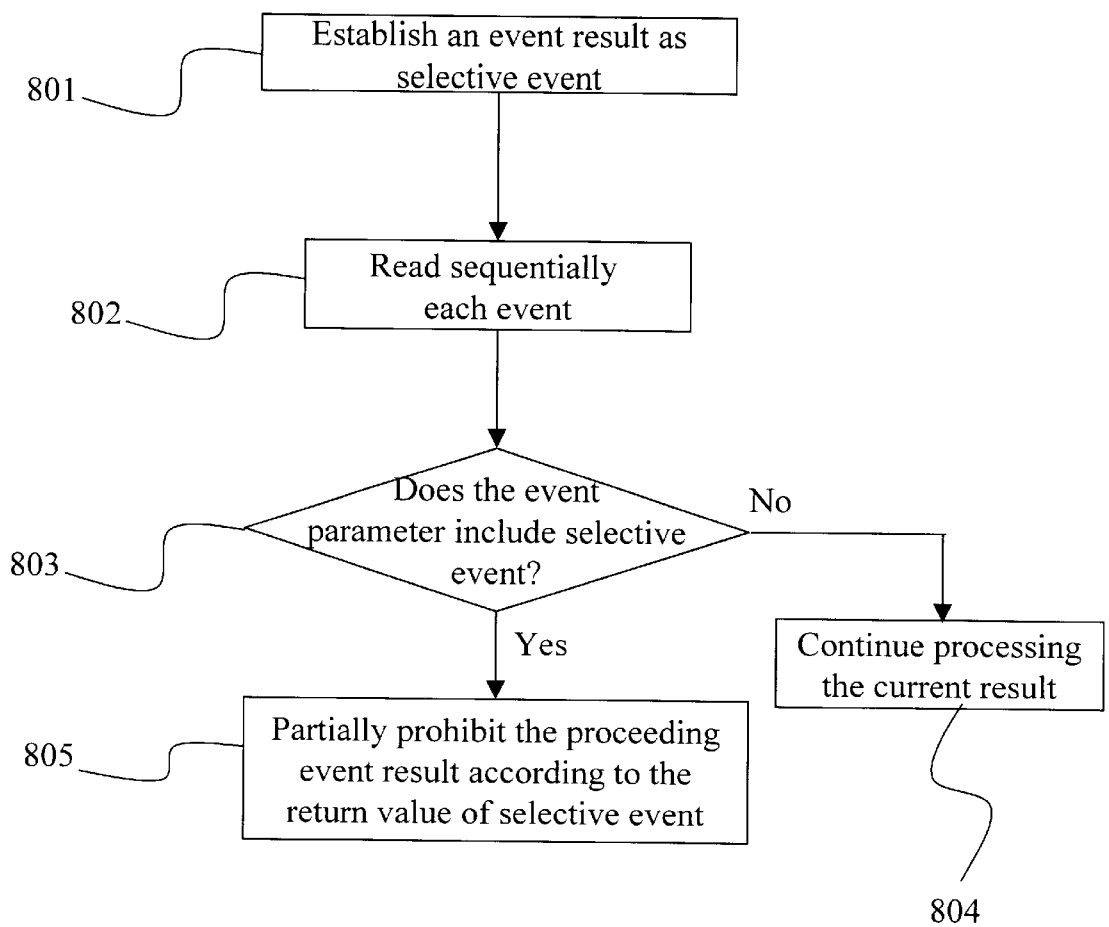
FIG. 8 is a flowchart showing the process of branching an event for a simulation game according to the invention.

FIG. 8 is a flowchart showing the process of branching an event for a simulation game according to the invention. An event result is established as a selective event (step 801) in which a plurality (generally two or four) of selections are provided for the user to choose. Each event is read sequentially (step 802), and whether or not the event parameter includes a selective event is checked (step 803). It continues processing the current event if there is no selective event (step 804). Otherwise, it partially prohibits the proceeding event result according to the return value of the selective event (step 805).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for organizing events in a simulation game, comprising at least steps of:

sequentially reading each event for accomplishing a mechanism of event loop;

deciding a place where the event happens according to place number set for the place;

deciding an event status according to event results set for passing X days;

deciding an event process according to job conditions set for the event;

processing an event according event number set for the event;

processing a event according to point number allocated for a point on a map; and selectively finishing an event result according to selections set for a selective event.

2. A method for organizing events in a simulation game according to claim 1 wherein said event comprises three factors of conditions, executors and results.

3. A method for organizing events in a simulation game according to claim 2 wherein said executors comprises common players and proficient players.

4. A method for organizing events in a simulation game according to claim 2 wherein said results are a plurality of results.

5. A method for organizing events in a simulation game according to claim 1 wherein said step of deciding event process further comprises step of clearing a job.

6. A method for organizing events in a simulation game according to claim 1 wherein said step of selectively finishing an event result further comprises steps of providing a plurality of selections for user to choose.

* * * * *